United States Patent [19]

Höfling

[11] Patent Number: 4,775,044

[45] Date of Patent: Oct. 4, 1988

[54] PARALLEL DRIVE FOR ESCALATORS OR MOVING SIDEWALKS

[75] Inventor: Peter Höfling, Dortmund, Fed. Rep. of Germany

[73] Assignee: O & K Orenstein & Koppel Aktiengesellschaft, Dortmund, Fed. Rep. of Germany

[21] Appl. No.: 889,416

[22] Filed: Jul. 24, 1986

[30] Foreign Application Priority Data

Jul. 24, 1985 [DE] Fed. Rep. of Germany ....... 3526905

[51] Int. Cl.⁴ .......... B65G 21/00

[52] U.S. Cl. .......... 198/330; 198/331

[58] Field of Search .......... 198/330, 331

[56] References Cited

U.S. PATENT DOCUMENTS

| | | | |
|---|---|---|---|
| 2,929,483 | 3/1960 | Jin | 198/331 |
| 3,651,919 | 3/1972 | Vollmer | 198/331 |
| 3,696,909 | 10/1972 | Kojima et al. | 198/331 |
| 4,179,020 | 12/1979 | Heusler et al. | 198/326 |
| 4,206,708 | 6/1980 | Behle | 198/575 X |
| 4,227,605 | 10/1980 | Höfling | 198/331 |
| 4,580,675 | 4/1986 | Boltrek | 198/331 |

FOREIGN PATENT DOCUMENTS

| | | | |
|---|---|---|---|
| 733314 | 2/1943 | Fed. Rep. of Germany . | |
| 2541397 | 3/1977 | Fed. Rep. of Germany . | |
| 1151600 | 1/1958 | France | 198/330 |
| 1151601 | 2/1958 | France | 198/331 |
| 1575008 | 7/1969 | France | 198/331 |
| 1089029 | 4/1984 | U.S.S.R. | 198/330 |
| 2047646 | 12/1980 | United Kingdom | 198/331 |

*Primary Examiner*—Robert J. Spar
*Assistant Examiner*—Cheryl L. Gastineau
*Attorney, Agent, or Firm*—Martin A. Farber

[57] ABSTRACT

A parallel drive for escalators or moving sidewalks is located within the region of reversal and inside the rotating step or pallet belt, the drive including with electric motor, gearing, step or pallet drive apparatus and handrail drive apparatus. The apparati are driven by the drive shafts of a drive unit comprising electric motor and planetary gearing arranged with their axes parallel to the axes of driven shafts of the step or pallet drive and the handrail drive.

8 Claims, 7 Drawing Sheets

PARALLEL DRIVE FOR ESCALATORS OR MOVING SIDEWALKS

FIELD AND BACKGROUND OF THE INVENTION

The present invention refers to a parallel drive for escalators or moving sidewalks located within the region of reversal and inside the rotating step or parallel belt, with electric motor, gearing, step or pallet drive means and handrail drive means.

In the drives for escalators or moving pavements known up to the present time, in which the drive unit is provided within the region of reversal and inside the rotating passenger conveyor belt, a continuous trend can be noted directed at installing higher powers within this limited space, at reducing the noise of the installation and at providing an economic means of transportation.

Thus modern forms of construction are characterized by a chainless transmission of power from the electric motor in particular to the step or pallet drive shaft, an overhung mounting of the electric motor and its direct flanging to the gear housing leading furthermore to a compact construction (Federal Republic of Germany Pat. No. 25 41 397).

In all previously known designs referred to as head drive, the drive shaft of the electric motor and the input shaft of the gearing are arranged in the direction of movement of the conveyor belt and therefore perpendicular to both the step or pallet drive shaft and the handrail drive shaft. This was done in order to be able to install the necessary electric drive power, and to achieve the necessary reduction in the speed of rotation by means of a worm gearing.

The large step-down ratio and the great quietness in operation possible with of the use of worm gearings undeniably constituted advantages. However, there is still an undiminished need for better economy of such a passenger conveyor belt, directed as a whole at a still smaller structural size of the drive unit with the same or possibly even increased capacity for electric power.

The relatively poor efficiency of the worm gearing and the position of the electric motor in particular provide incentive to look for further solutions.

SUMMARY OF THE INVENTION

The object of the present invention is to create a more compact drive arrangement for escalators or moving sidewalks which furthermore not only requires less space than all the known embodiments but at the same time provides increased capacity for electric power.

According to the present invention the drive shafts of a drive unit comprises an electric motor and a planetary gearing are arranged parallel to the axes of the driven shafts of the step or pallet drive and the handrail drive.

Further features of the invention are based in particular on the use of a planetary gearing and an external-rotor electric motor.

The use of a planetary gearing has an advantage over the worm gearing previously used in that the overall efficiency of the transmission unit can be greatly improved. For the same output power a speed reducer can be positioned within an even smaller space. The transmission output gear can cooperate in direct engagement with the step or pallet-drive shaft gear and/or the handrail drive-shaft gear, avoiding all the intermediate gears which were previously necessary. The small dimensions of a planetary gearing, particularly in the shaft direction, affords, in a particularly advantageous manner, the possibility of making the overall dimensions of the combination with the electric motor smaller than ever before achieved.

Along this line it is possible, despite the small width of the passenger conveyor belt, not only to arrange the drive shafts of the electric motor and the transmission parallel to the driven shafts of the step or pallet drive and the handrail drive, but also to place the drive unit consisting of electric motor and transmission even between the driven shafts and/or directly alongside of them.

As a further advantageous result, the total installed length of an escalator or a moving sidewalk can thus be decreased since the length of the head which takes up a particularly large amount of space can be shortened.

It is obvious that the improvement in efficiency of the transmission, and particularly the elimination of intermediate gears, leads in the final analysis also to a saving of energy for the operation of the passenger conveyor belt. Nor is this contradicted in principle by the fact that, if necessary, the handrail drive shaft can be driven via a chain from the pallet or step drive shaft instead of directly via spur gears from the transmission.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
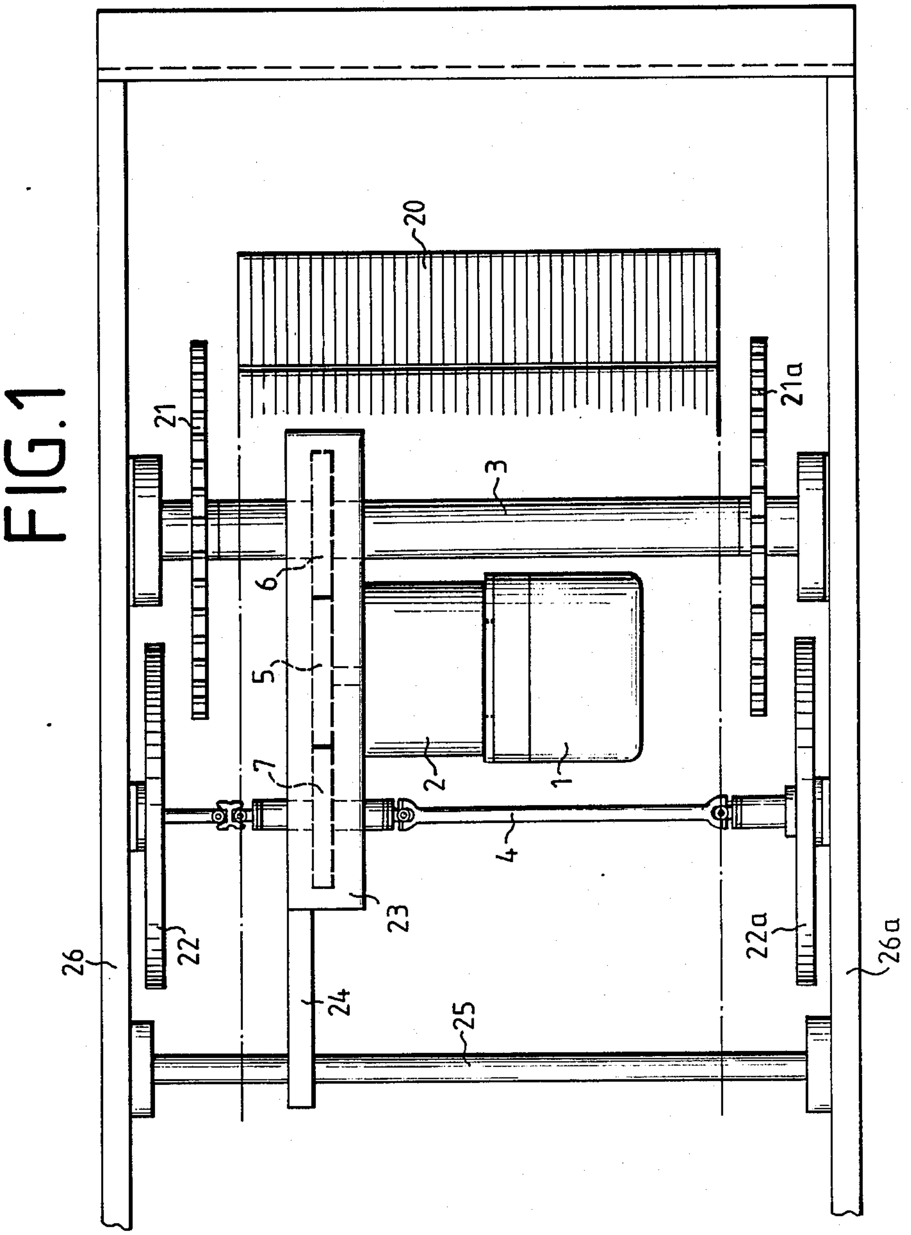
FIG. 1 is a plan view of an escalator of the invention showing mechanical connections of a drive unit thereof.

An escalator having a parallel drive is shown diagrammatically in FIG. 1, and includes a well-known passenger conveyor belt 20, driven by sprocket wheel 21, 21*a*, and a handrail drive gear 22, both mounted within frame side plates 26, 26*a*. A power take-off gear housing 23 is fastened on a support 25 via a torque support arm, as is commonly done in the case of a head drive.

FIG. 1 furthermore shows that, in accordance with the teaching of the invention, the drive shafts of a drive unit comprising an electric motor 1 and planetary gearing 2 are arranged parallel to axes of driven shafts of a step or pallet drive and a handrail drive. In this connection, the drive unit comprising the electric motor 1 and the planetary gearing 2 is located between a shaft 3 of the step or pallet drive and a handrail drive shaft 4. Said drive unit represents a compact structural part which can be attached by flanging in cantilevered manner to the power take-off gear housing 23, in which connection, with a cantilevered mounting of the electric motor 1, the motor can be connected in the same manner to the power take-off gearing housing 23.

Such a structural form is made possible by a new use of the planetary gearing 2 for head drives for passenger conveyor belts, and is advantageously further improved if the electric motor 1 is constructed as an external-rotor motor.

It is indicated in FIG. 1 that the transmission output gear 5 is in direct engagement with a gear 6 on the shaft 3 of the step or pallet drive, and with a gear 7 on the handrail drive shaft 4.

Figure 2:
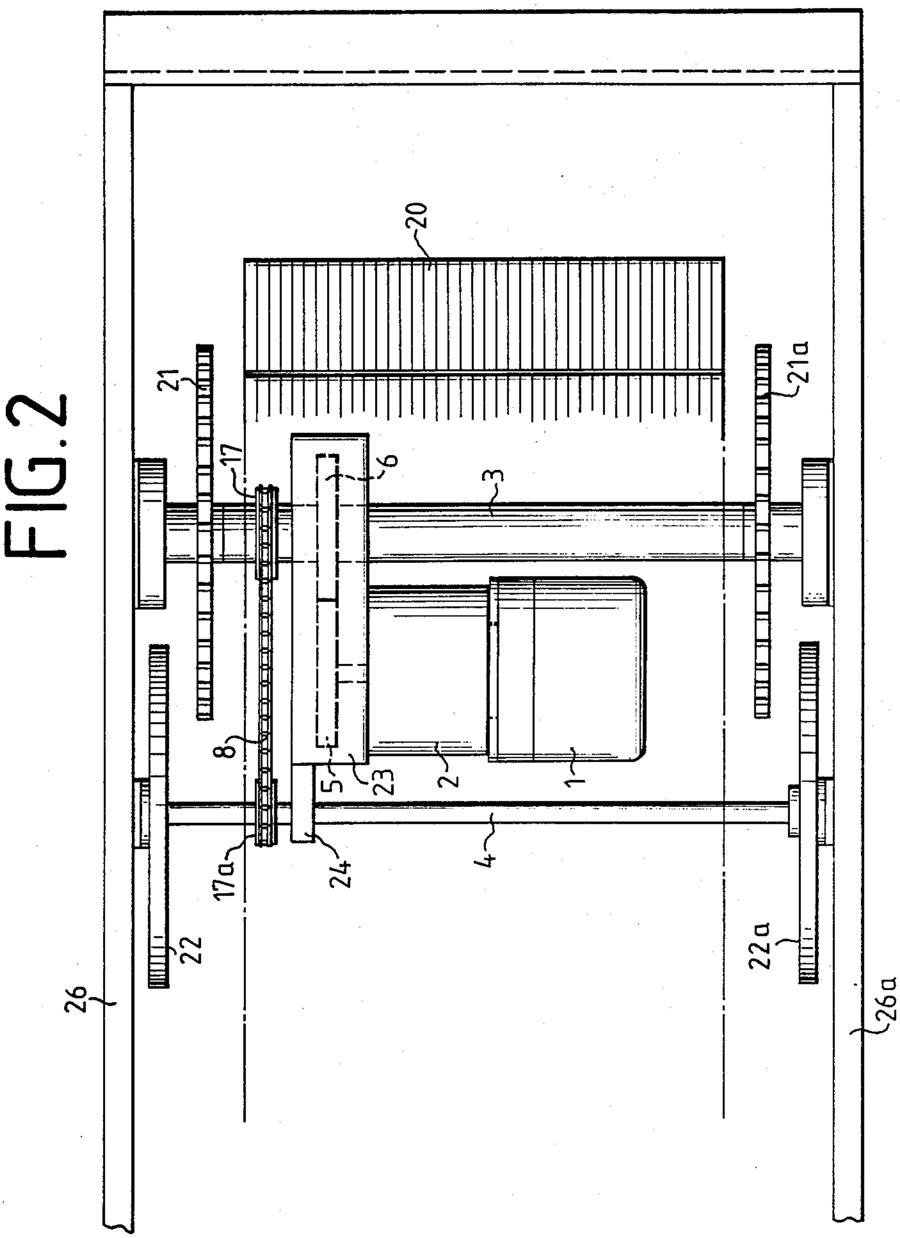
FIG. 2 is a plan view of an alternative embodiment of the drive unit of FIG. 1 employing a drive chain.

FIG. 2 shows the construction of a head drive in which the step or pallet drive shaft 3 drives the handrail drive shaft 4 by means of handrail drive sprocket wheels 17, **17*a* via a drive chain 8**.

Figure 3:
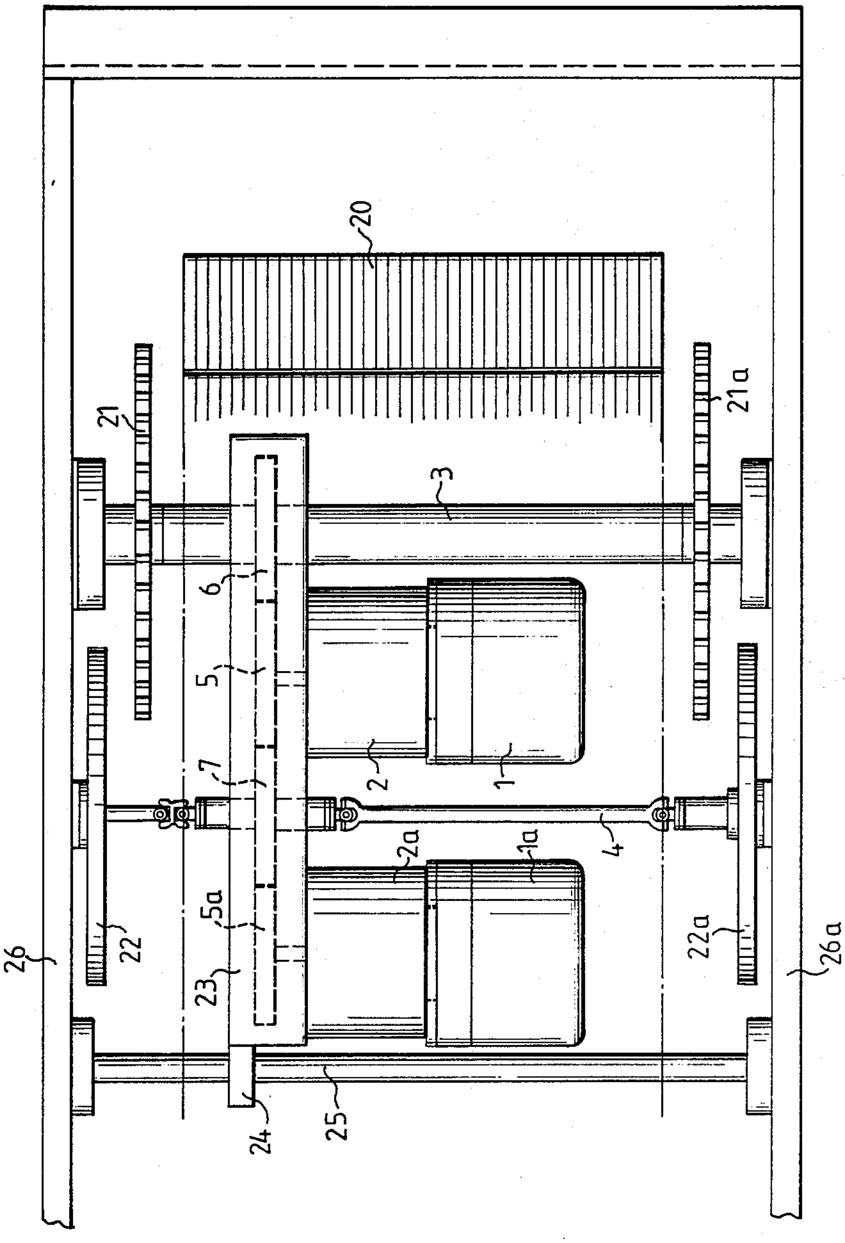
FIG. 3 is a plan view of an alternative embodiment of the drive unit of FIG. 1 employing a second motor.

The construction shown in both FIGS. 1 and 2, which includes only the single drive unit consisting of the electric motor 1 and the planetary gearing 2, can be modified as shown in FIG. 3 to have its drive power increased to accommodate twice the difference in height of an escalator which can be bridged over, without any substantial change in the length of the head being thereby necessary, by providing alongside the handrail drive shaft 4 another drive unit consisting of another electric motor **1*a* and another planetary gearing 2*a***.

A additional transmission output gear **5*a* is placed in direct engagement only with the handrail drive shaft gear 7. Due to the direct coupling, the drive power, however, of the additional drive unit is transmitted also with excellent efficiency to the step or pallet drive shaft 3 and finally the sprocket wheel 21, 21*a*. This double drive unit can also be positioned fixedly by the torque support arm 24 by the support member 25**.

Figure 4:
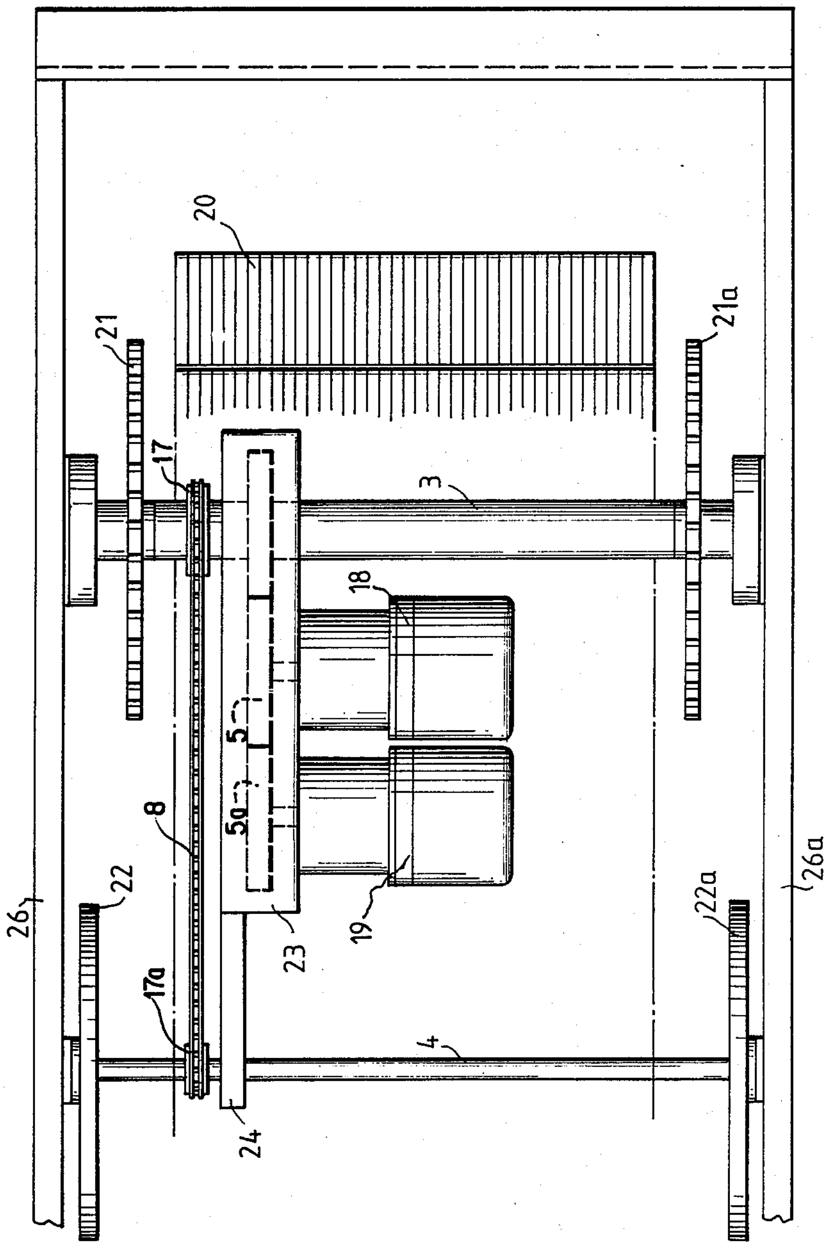
FIG. 4 is a plan view of an alternative embodiment of the drive unit of FIG. 3 with the motors rearranged.

As a further development of the invention, FIG. 4 shows a construction in which the drive unit is formed of two individual drive units 18 and 19 arranged on the same side of the power take-off gear housing 23, each drive unit having an electric motor 1 and a planetary gearing 2.

Figure 5:
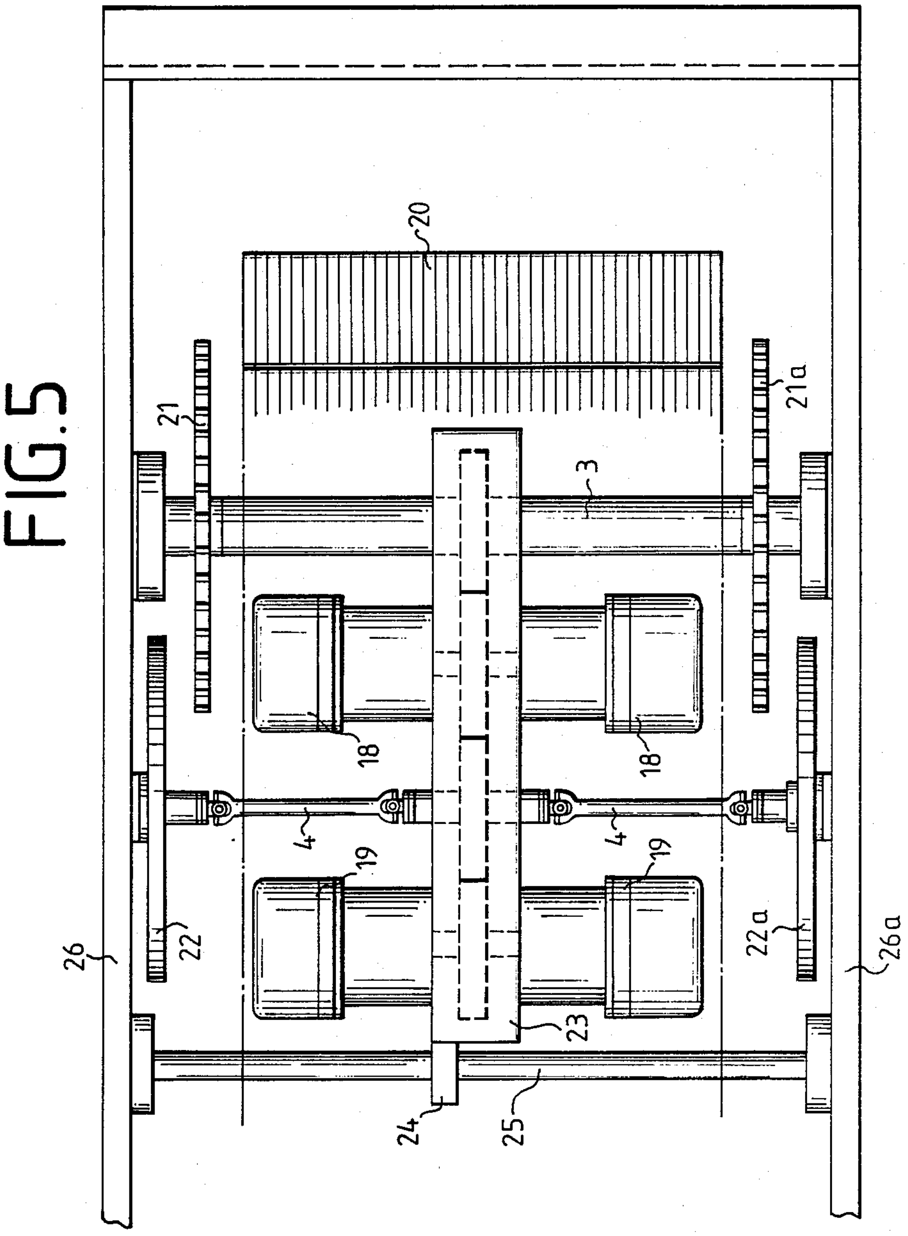
FIG. 5 is a plan view of an alternative embodiment of the drive unit of FIG. 3 with four motors.

FIG. 5 shows an arrangement, based on the teaching of the invention, in which the single drive units 18 and 19 are replaced with two individual drive units with identical center lines arranged on opposite sides of the power take-off gear housing 23, each having an electric motor and planetary gearing.

Figure 6:
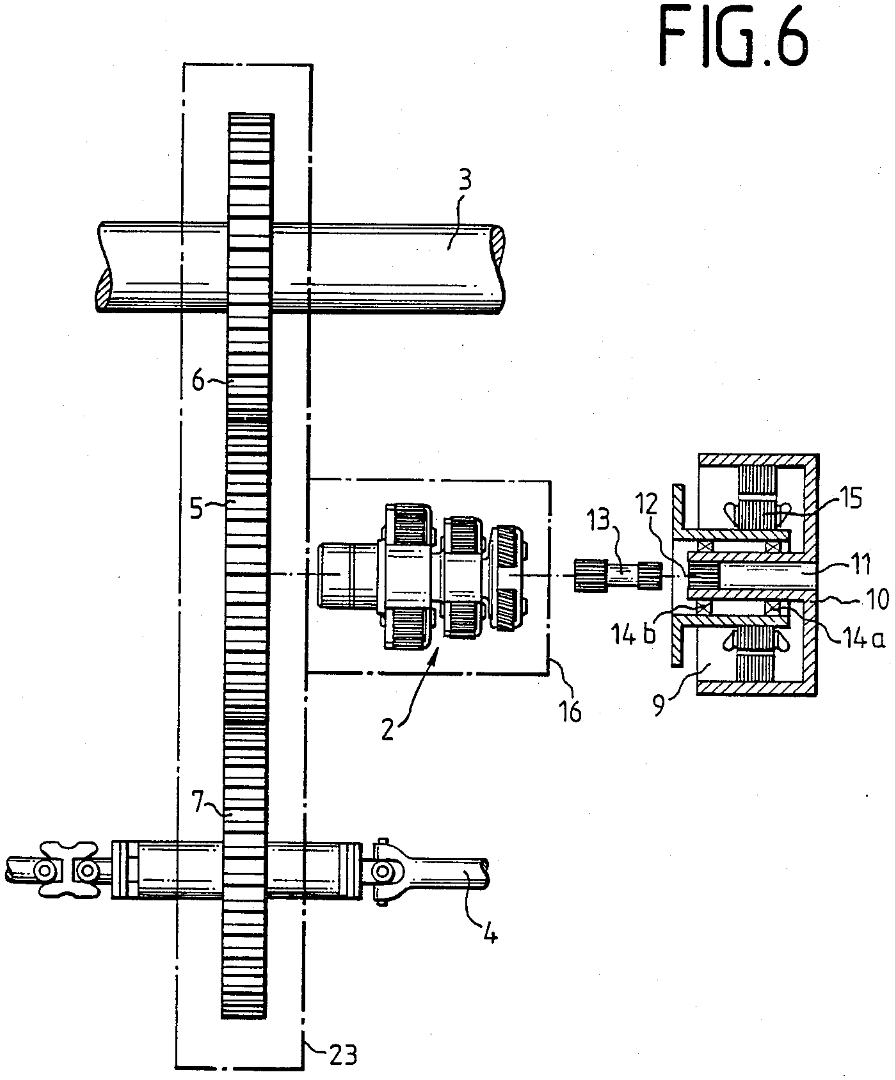
FIG. 6 is a detailed view showing internal components of a motor of FIG. 1.

FIG. 6 shows a construction of an embodiment of the electric motors 1, **1*a* as external-rotor motor 9 with a rotor 10 developed as a hollow shaft 11 having an inner toothing 12 to receive planetary gearing input shaft 13. It is furthermore shown that a hollow shaft 11 is mounted via ball bearings 14*a*, 14*b* in the stator 15 of the external-rotor motor 9, the external-rotor motor 9 being flanged onto a planetary gearing housing 16 and the planetary gearing input shaft 13** being developed as a plug-in shaft.

Figure 7:
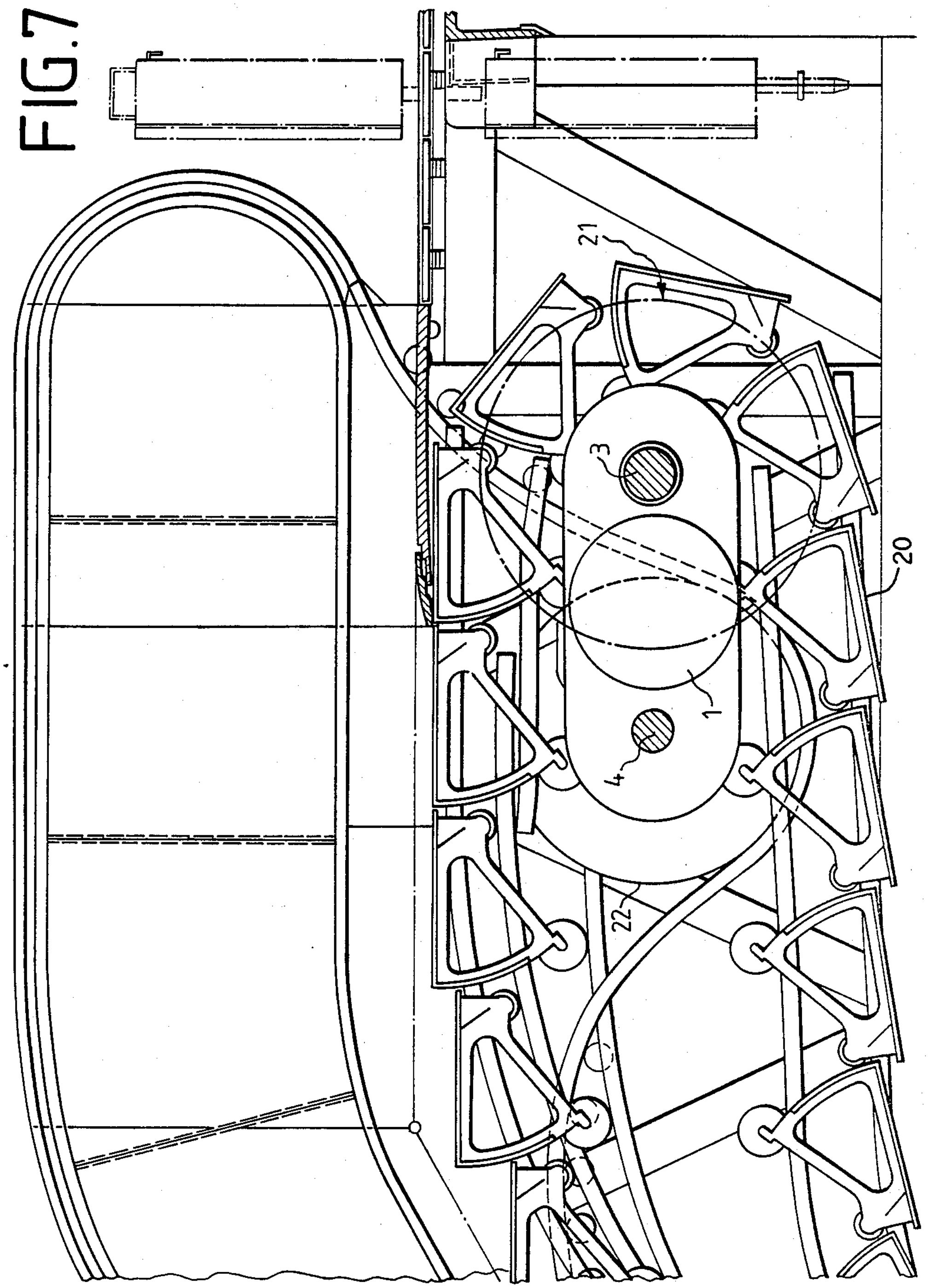
FIG. 7 is a partial side view of a mechanism of the escalator.

FIG. 7 is a side view of the new parallel drive installed in the region of reversal inside the rotating step or pallet belt, with the electric motor 1, the step or pallet drive shaft 3, the handrail drive shaft 4, the sprocket wheel 21 and the handrail drive wheel 22 being specifically indicated.

It is to be understood that the above described embodiment of the invention is illustration only and that modifications thereof may occur to those skilled in the art. Accordingly, this invention is not to be regarded as limited to the embodiment disclosed herein, but is to be limited only as defined by the appended claims.

Legend of Reference Numbers

1 Electric motor
**1*a*** Additional electric motor
2 Planetary gearing
2 Additional planetary gearing
3 Step or pallet drive shaft
4 Handrail drive shaft
5 Transmission output gear
**5*a*** Additional transmission output gear
6 Step or pallet drive shaft gear
7 Handrail drive shaft gear
8 Drive chain
9 External-rotor motor
10 Rotor
11 Hollow shaft
12 Inner toothing
13 Planetary gearing input shaft
14 Ball bearing
**14*a*** Ball bearing
15 Stator
16 Planetary gearing housing
17 Handrail drive sprocket wheel
**17*a*** Handrail drive sprocket wheel
18 Individual drive unit
19 Individual drive unit
20 Passenger conveyor belt
21 Sprocket wheel
**21*a*** Sprocket wheel
22 Handrail drive wheel
**22*a*** Handrail drive wheel
23 Power take-off gear housing
24 Torque support arm
25 Support
26 Frame side plate
**26*a*** Frame side plate

I claim:

1. A drive for a conveyor belt in escalators and moving sidewalks, respectively, wherein:

said drive is disposed within a region of reversal of and completely inside the conveyor belt, said drive comprising an electric motor, a gearing driven by the motor, and drive means for driving the conveyor belt and handrail drive means for driving a handrail, the drive means including a conveyor belt drive shaft and a handrail drive shaft, respectively; and wherein said gearing includes a planetary gearing having an output gear, said electric motor and said output gear of said planetary gearing constitute a drive unit and have identical center line axes; and wherein said drive unit has its axis arranged parallel to and spacially completely between the conveyor belt drive shaft and the handrail drive shaft; and wherein the conveyor belt drive means includes a conveyor belt drive shaft gear mounted on said conveyor belt drive shaft; and wherein said output gear of the planetary gearing is in direct engagement with said conveyor belt drive shaft gear and operatively connected to said handrail drive shaft.

2. A drive according to claim 1, wherein:

the handrail drive means includes a handrail drive shaft gear mounted on said handrail drive shaft; and wherein the planetary gearing output gear is in direct engagement with the handrail drive shaft gear.

3. A drive according to claim 1, further comprising:

a power take-off gearing housing to which said drive unit is cantilevered; and an additional drive unit comprising an additional electric motor and an additional planetary gearing which have identical center line axes, said additional drive unit being located parallel to the first-mentioned drive unit and on the same side of the power take-off gearing housing to which said additional drive unit is cantilevered.

4. A drive according to claim 3, wherein:

said additional planetary gearing has an output gear, and said handrail drive means includes a handrail drive shaft gear mounted on said handrail drive shaft; and wherein the output gear of the additional planetary gearing of the additional drive unit is in direct engagement with at least one of the handrail drive shaft gear and the output gear of the first-mentioned planetary gearing.

5. A drive according to claim 1, wherein:

said handrail drive means includes handrail drive sprockets mounted on said handrail drive shaft and on said conveyor belt drive shaft and a drive chain interconnecting said sprockets; and wherein the conveyor belt drive shaft drives the handrail drive shaft by means of said handrail drive sprockets via said drive chain.

6. A drive according to claim 3, wherein:

the first-mentioned drive unit and the additional drive unit each consists of two individual respective of said drive units arranged cantilevered with identical center line axes on opposite sides of the power take-off gearing housing, each of said two individual drive units consisting of an individual respective said electric motor and an individual respective said planetary gearing.

7. A drive according to claim 1, wherein:

the electric motor is formed as an external-rotor motor;

a rotor of the external-rotor motor is formed as a hollow shaft with an internal toothing to receive an input shaft of the planetary gearing of said drive unit;

said external-rotor motor has a stator; and wherein the hollow shaft is mounted via ball bearings in the stator of the external-rotor motor.

8. A drive according to claim 3 wherein:

each electric motor is formed as an external-rotor motor.

* * * * *